United States Patent [19]

Hegarty

[11] Patent Number: 4,545,787
[45] Date of Patent: Oct. 8, 1985

[54] PROCESS FOR PRODUCING BY-PRODUCT OXYGEN FROM TURBINE POWER GENERATION

[75] Inventor: William P. Hegarty, Allentown, Pa.

[73] Assignee: Air Products and Chemicals, Inc., Allentown, Pa.

[21] Appl. No.: 635,400

[22] Filed: Jul. 30, 1984

[51] Int. Cl.[4] .................. B01D 53/22; B01D 53/04
[52] U.S. Cl. ........................................ 55/16; 55/25; 55/68; 55/74
[58] Field of Search ............... 55/16, 25, 26, 58, 62, 55/68, 74, 75

[56] References Cited

U.S. PATENT DOCUMENTS

| | | | |
|---|---|---|---|
| 2,540,151 | 2/1951 | Weller et al. | 55/16 |
| 3,359,705 | 12/1967 | Mullhampt | 55/16 |
| 3,509,694 | 5/1970 | Imai et al. | 55/16 |
| 3,550,355 | 12/1967 | Remus et al. | 55/16 |
| 3,579,292 | 5/1971 | Mullhaupt et al. | 423/579 |
| 3,713,271 | 1/1973 | Franz et al. | 55/16 |
| 3,930,814 | 1/1976 | Gessner | 55/16 |
| 3,980,763 | 9/1976 | Mullhaupt | 423/579 |
| 4,011,065 | 3/1977 | Munzner et al. | 55/25 |
| 4,013,429 | 3/1977 | Sircar et al. | 55/33 |
| 4,132,766 | 1/1979 | Erickson | 423/579 |
| 4,174,955 | 11/1979 | Blackmer et al. | 55/158 |
| 4,190,420 | 2/1980 | Covington et al. | 422/57 X |
| 4,198,213 | 4/1980 | Mannatt | 55/16 |
| 4,224,045 | 9/1980 | Olszewski et al. | 62/30 |
| 4,264,338 | 4/1981 | Null | 55/16 |
| 4,264,339 | 4/1981 | Juntgen et al. | 55/25 |
| 4,312,851 | 1/1982 | Isalski et al. | 55/25 X |
| 4,330,633 | 5/1982 | Yoshisato et al. | 501/152 |
| 4,340,578 | 1/1982 | Erickson | 423/579 |
| 4,376,640 | 3/1983 | Vo | 55/26 |
| 4,382,366 | 5/1983 | Gaumer | 62/31 |
| 4,392,871 | 7/1983 | Almlof et al. | 55/25 X |
| 4,415,340 | 11/1983 | Knoblauch et al. | 55/25 |

FOREIGN PATENT DOCUMENTS 0082600 11/1982 European Pat. Off. .

OTHER PUBLICATIONS

Ismail et al., "Rates & Heats of Oxygen Chemisorption on Saran Chars at 100° C.", J. of Colloid & Interface Science, vol. 75, No. 2, Jun. 1980, pp. 299–312.

Primary Examiner—Robert Spitzer
Attorney, Agent, or Firm—Geoffrey L. Chase; E. Eugene Innis; James C. Simmons

[57] ABSTRACT

A method is set forth for the generation of net power and the recovery of by-product oxygen-enriched gas at low power requirements. Air is compressed to elevated temperature and pressure, at least a portion of the air is combusted and a portion of the oxygen is removed from the air or combustion effluent through a membrane or adsorbent before the oxygen lean combustion effluent is expanded through a turbine to recover power for the process and net power.

10 Claims, 1 Drawing Figure

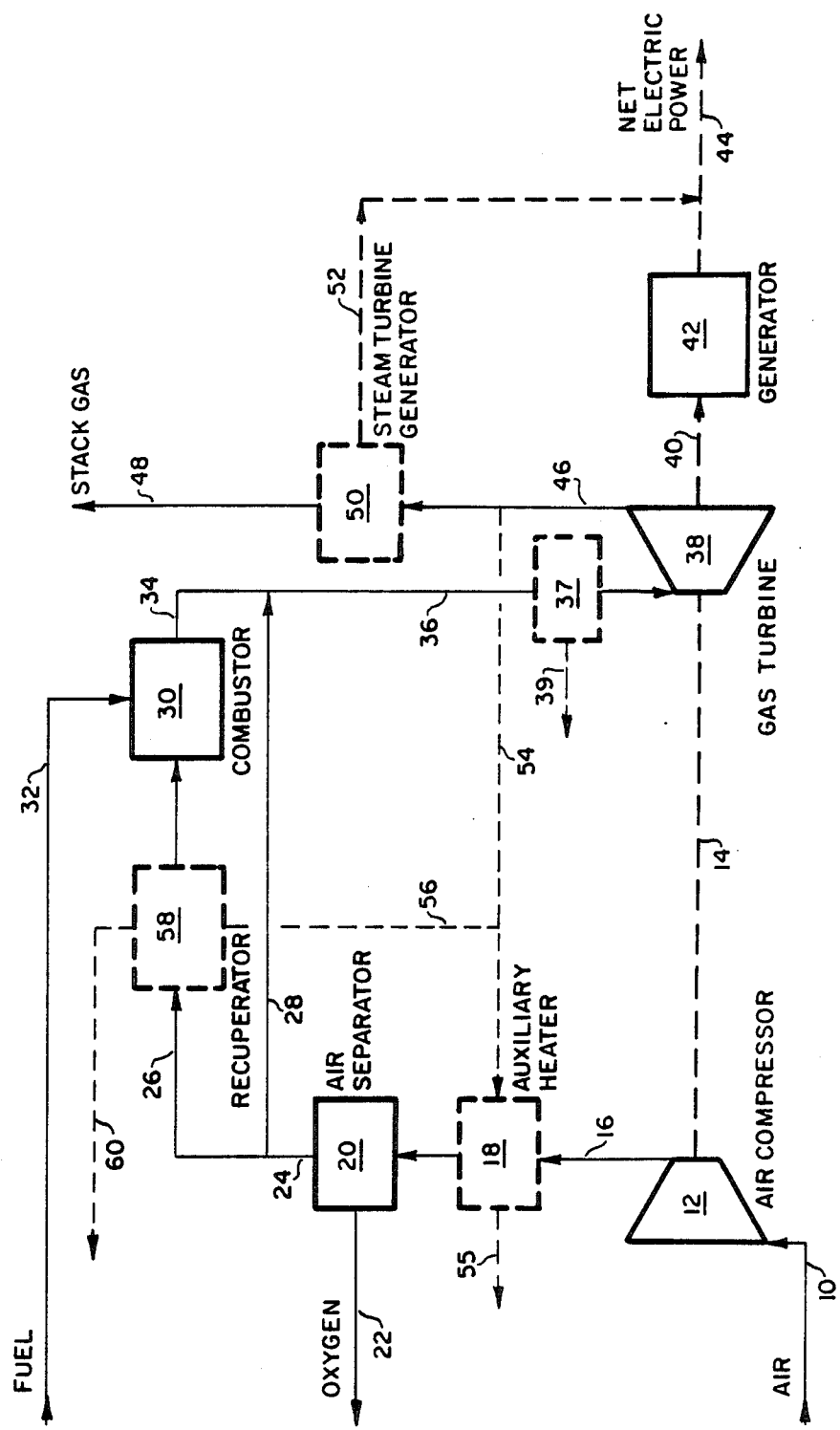

PROCESS FOR PRODUCING BY-PRODUCT OXYGEN FROM TURBINE POWER GENERATION

TECHNICAL FIELD

The present invention is directed to a system for the recovery of oxygen while predominantly generating power with the traditional combustion of gas and subsequent expansion through a turbine. More specifically, the present invention is directed to the separation of air by non-cryogenic means to recover oxygen from an air stream being compressed for subsequent combustion and expansion through a power turbine for the production of net power, as well as the power to operate the process.

BACKGROUND OF THE PRIOR ART

The separation of gas streams, most notably air into its constituent components, such as oxygen and nitrogen, has been practiced for many years utilizing energy intensive processes for the recovery of various purities and volumes of gas product. Chemical adsorption of individual gas components, fractional cryogenic distillation of various gas components and differential permeation through membrane media have all been practiced in order to recover components of gas streams and more particularly oxygen and/or nitrogen from air. These processes generally suffer from high utility costs or the lack of continuous or convenient regeneration or operation.

Various processes for separation of gas streams, such as air, have been contemplated wherein at least some power is recovered from an effluent stream to be utilized in the power requirements of the process itself.

For instance, in U.S. Pat. No. 4;132,766, a chemical air separation process is set forth wherein air is compressed to elevated pressure before being chemically separated into oxygen and a nitrogen-rich waste stream by the chemical binding of oxygen from the air differentially over the nitrogen. The effluent nitrogen rich stream is then reduced in pressure through an expander before being vented. The expander drives the compressor to recover at least some power for the process. No net power is achieved by the process.

Alternately, it has been suggested, as in European Patent Application No. 0082600, that air may be compressed in a compressor, reduced in temperature by heat exchange against process streams or external cooling means and then separated into oxygen and a nitrogen-rich effluent stream by passage of the compressed and cooled air over a semipermeable membrane which selectively allows the migration of oxygen through the membrane for isolation. The nitrogen-rich effluent stream is then rewarmed by heat exchange against the compressed air feed stream before being expanded to reduced pressure with the recovery of power for the compression requirements of the process. No fuel is combusted and no net power is produced, and in fact, a power import is required in order to overcome inefficiencies in the process, as illustrated in FIG. 1 of the application.

In order to provide additional power for the operation of compression equipment in a gas separation process, it has also been contemplated to combust a waste stream to provide additional power derived from fuel mixed with the waste stream being combusted. For instance, in U.S. Pat. No. 4,340,578 a chemical air separation technique is disclosed wherein air is compressed, separated into oxygen and a nitrogen-rich stream by chemical agents and then the nitrogen rich stream which still contains residual oxygen is mixed with fuel and combusted in a combustion zone wherein the hot effluent of the combustion zone is expanded in several stages through turbines and power is recovered for the compression requirements of the process. No net power is derived.

A similar combustion utilization is described in U.S. Pat. No. 4,224,045 wherein a cryogenic air separation is utilized. In this patent, process air is compressed in a compressor and then reduced significantly in temperature to the liquefaction temperature of the components of the air before being distilled in a cryogenic fractionation column. A waste stream from the low pressure column of the cryogenic separation is rewarmed, recompressed and then combusted with fuel and by-pass air which has not been subject to cryogenic separation, before the combustion effluent is expanded through a turbine to recover power for the process. Net power is derived from the process.

Power generation is contemplated in the cryogenic air separation process described in U.S. Pat. No. 4,382,366. In this process, air is initially compressed and then reduced in temperature to effect a cryogenic separation of oxygen and nitrogen. The nitrogen-rich waste effluent from the cryogenic distillation is rewarmed and combusted with fuel before being expanded through a turbine to lower pressure to power the air compressor to the cryogenic distillation. Additional power is recovered for oxygen product compression, and net electric power can be generated from the expander turbine and an associated steam turbine operating off the waste heat exhausted from the main expander turbine. Although this system produces net power, the overall process for the generation of oxygen is an energy intensive cryogenic or low temperature air distillation scheme.

Additional art of general relevance includes: U.S. Pat. Nos. 2,540,151, 3,713,271, 3,930,814, 4,174,955 and 4,198,213.

The present invention overcomes the disadvantages of the prior art by recovering a minor amount of the oxygen content of air being compressed for power generation with low capital cost and energy requirements for the separation in conjunction with the normal generation of significant amounts of power through combustion and expansion in the turbine equipment of the compressed gases less the oxygen recovered by non-cryogenic separation. This is performed while the air is at elevated temperature.

BRIEF SUMMARY OF THE INVENTION

The present invention is directed to a method for the generation of power in a combustion turbine and for the production of an oxygen-enriched product, comprising the steps of: compressing a feed air stream to an elevated pressure and temperature wherein the volume of air treated is in excess of that necessary for the combustion preceding the turbine, combusting at least a portion of the elevated pressure air stream with a fuel stream and expanding the elevated pressure combustion product stream from said combustion through a turbine so as to provide power for the air compression and to recover net power from the system, wherein the improvement comprises separating a portion of the oxygen in the elevated pressure stream while still at elevated temperature by resolution with a separatory media and removing oxygen-enriched gas as a by-product stream and a resulting oxygen-depleted air stream either before the combustion step or after the combustion step.

Preferably, the present invention is directed to a method for the generation of power in a combustion turbine and production of an oxygen-enriched product, comprising the steps of: compressing a feed air stream to an elevated pressure and temperature wherein the volume of air treated is in excess of that necessary for the combustion turbine, separating a portion of the oxygen in the compressed air stream while still at elevated temperature by resolution with a separatory media, removing oxygen-enriched gas as a by-product stream and a resulting oxygen-depleted air stream, combusting at least a portion of the oxygen-depleted air stream with a fuel stream and expanding the combustion product stream from said combustion through a turbine to provide power for the air compression and to recover net power from the system.

Alternately, the separation and recovery step can be performed after the combustion step or simultaneous with the combustion by performing the separation on the bypass stream circumventing the combustion stage.

Preferably, the separation of oxygen from the feed air stream is done by passage of the air stream over a semipermeable membrane having a pressure differential across the membrane wherein the membrane allows for the selective permeation of oxygen through said membrane differentially to nitrogen.

Alternately, the process may utilize a pressure and/or temperature swing sorption system having a sorbent selective for the retention of oxygen over nitrogen for the recovery of the oxygen by-product from the feed air stream.

Preferably, a portion of the feed air stream to the turbine is by-passed around the combustion stage of the process and is mixed with the combustion effluent in order to quench the effluent to a lower temperature compatible with the turbine materials.

Alternately, in addition to providing power for the process requirements and net power for export in the combustion turbine, the process may utilize the turbine effluent to produce steam for additional net power recovery.

BRIEF DESCRIPTION OF THE DRAWING

The drawing is a schematic representation of the process of the present invention showing various alternate modes of operation in dotted line configuration.

DETAIL DESCRIPTION OF THE INVENTION

The present invention preferably involves the adaptation of a conventional power generation system to provide by-product oxygen at significantly reduced utility requirements for the amount of oxygen produced. The separation is performed with a non-cryogenic technique which uses a resolution of oxygen from nitrogen at elevated temperature by passage of the feed air to the combustor of the power cycle past a semipermeable membrane or alternately through a bed of sorbent selective for oxygen utilizing a pressure and/or temperature swing sequence of operation.

The technique for recovery of by-product oxygen in the present invention requires that the oxygen be separated at high temperatures downstream from the compression equipment of the air feed. In some cases it may be useful to increase the temperature of the feed to oxygen separation above that attained by the compression of the feed air and to this end auxiliary heating means may be provided. However, generally speaking the separation will be done at above ambient conditions particularly above ambient temperatures, specifically at temperatures above 400° F. Typically, most prior art semipermeable membranes would not maintain integrity at such elevated temperatures. However, several silver composite membranes are known which will operate under these severe conditions, such as those disclosed in U.S. Pat. Nos. 3,359,705 and 3,550,355. Also, a composite metal oxide solid electrolyte that can function as an oxygen permeable membrane at higher temperatures is known, as described in U.S. Pat. No. 4,330,633. All incorporated herein by reference.

Alternately, as recited above, the separation of by-product oxygen can be achieved by passage through a sorbent bed operating in a pressure and/or temperature swing sequence. Such a technique is known for the separation of oxygen from nitrogen in a non-power process, such as recited in U.S. Pat. No. 4,013,429, wherein a sorbent selective for oxygen would be utilized and the nitrogen-enriched stream would flow through the bed without significant pressure drop. Chemical sorption systems are also known and relevant for the high temperature separation of the invention such as the praseodymium system of U.S. Pat. No. 3,980,763 and the strontium system of U.S. Pat. No. 3,579,292, both of which are incorporated herein by reference.

Low energy of oxygen is possible from the process of the present invention because the total air stream compressed for use in a power turbine process is typically far in excess of that necessary to provide the oxygen for combustion with fuel to provide sufficient power recovery in the downstream combustion turbine. The large excess of compressed air delivered to the turbine, usually 300-400%, is necessary to maintain turbine inlet temperatures below the material limitations of the turbine nozzles and blades. Such limitations are typically in the neighborhood of 2,000° F. Metallurgical improvements and improved cooling techniques however are gradually raising these maximum limiting temperatures. Therefore, in light of the large excess of air being passed through the system, the deletion of a minor portion of oxygen from that excess air still results in sufficient oxygen for complete combustion of fuel and sufficient total air stream available for cooling and adequate expansion through the turbine. However, oxygen recovery as a by-product should not constitute such a significant reduction in total flow as to interfere with the design performance matching between the air compression equipment and the gas turbine expansion equipment of the power generation system.

The present invention will now be described in greater detail with reference to a preferred embodiment, as illustrated in the drawing. On the drawing optionally used equipment and flows are shown with dotted lines. An air feed stream 10 is introduced into a compressor unit 12 which is illustrated for purposes of this embodiment as a multistage compressor without intercooling. However, it is understood that a series of staged compressors with intercooling could be utilized to effect similar results. The air is compressed adiabatically to a pressure of approximately 175 psia and achieves a temperature of approximately 765° F. The compressed air leaving the compressor unit in line 16 optionally can be further heated in an auxiliary heat exchanger 18 against a process stream. This high temperature, high pressure air stream is then passed through an air separation unit 20 which preferably comprises a vessel having a semipermeable membrane selective to the migration of oxygen through the membrane to a low pressure zone, wherein the membrane operates and can sustain high temperature conditions. High temperature for the purposes of this invention is defined as above 400° F. The preferred temperature range of operation for the membrane would be 700°-1100° F. Membranes which can be utilized at such conditions include the silver composite membranes identified above, as well as yttrium doped zirconium membranes or other solid oxide electrolyte membranes. Generally, inorganic membranes would be preferred over organic membranes at these severe process conditions.

The relatively pure oxygen by-product is removed on the lower pressure side of the membrane through line 22. The thus oxygen-depleted feed air stream is removed from the air separation unit 20 in line 24 and is split into a by-pass air feed stream 28 and a remaining feed air stream 26. The remaining feed air stream 26 can optionally be further heated in a recuperative heat exchanger 58 against process streams. The nitrogen-enriched stream in line 26 has sufficient oxygen to support combustion and maintain a stable flame configuration when combined with fuel in line 32 and combusted in a traditional combustor 30. The combustion effluent in line 34 is removed at a high temperature of approximately 2700° F. and cooled to a lower temperature, which should not exceed about 2000° F. This temperature is achieved by the mixing of the by-pass air feed stream in line 28 with the effluent in line 34 to bring the outlet temperature from the combustion zone of approximately 2700° F. down to 2000° F. maximum by the blending of the two streams. The combined stream 36 is then expanded through a combustion turbine 38 to recover power for air compression and net power generation. Expander 38 may be linked to compressor 12 by any of the known methods in the art, such as a direct mechanical linkage 14, a series of gears providing appropriate reduction, or alternately, by electrical connection wherein the compressor and the turbine are matched to an electric motor and an electric generator, respectively. The combustion turbine 38 provides sufficient power to operate the compression equipment 12, as well as deliver net power to outside power production 42 in line 40, wherein any power utilization of the net power produced by turbine 38 can be contemplated, including an electric generator 42.

The effluent from the expander in line 46, at lower pressure, but still at a reasonably high temperature of approximately 1100° F., may be utilized in a number of alternative means besides mere venting of the stream as stack gas. At least a portion of the effluent can be directed through line 54 to an auxiliary heat exchanger 18 to warm the feed air stream downstream of compression and prior to air separation. This stream would then be vented in line 55. Alternately, the stream in line 54 may be entirely or partly diverted in line 56 to pass through a recuperative heat exchanger 58 to warm the remaining feed air stream 26 prior to its introduction into the combustor 30. This stream would then be vented in line 60.

Another alternative is to take at least a portion of the effluent stream in line 46 and generate steam which will then be passed through a steam turbine to generate additional net power, as set forth in box 50. The effluent from the steam turbine generator 50 in line 48 would be at approximately 500°-600° F. It can be contemplated that the power generated in the steam turbine, particularly if used to operate an electric generator, would produce electric power in line 52 which could be combined with the net power from the generator 42 and combined as a total electric output in line 44. However, it should be understood that the net power generated could be manifested in any state or form, either mechanical energy or electrical energy, as illustrated. It would also be possible in some situations to use the steam generated in box 50 for process or heating, rather than for power generation as indicated by line 52.

Still another alternative of interest calls for locating the air separation membrane in the combuster exhaust at 37 rather than in line 24. While the combustion will have reduced the oxygen by about 25%, selective permeation to separate oxygen in line 39 would still be practical using membranes as described in U.S. Pat. No. 4,330,633.

The amount of oxygen recovered and its effect on the generation of power is set forth in the table below in which several exemplary recovery schemes are enumerated. It is understood that these are merely exemplary and that any combination of power recovery and oxygen recovery could be contemplated for practice with the present system so long as adequate oxygen remains in the nitrogen-rich stream to the combustor to support stable flame burner operation and so long as sufficient total flow is passed to the turbine for power generation, such that efficiencies between that turbine and the compressor can be maintained and turbine temperatures are maintained below 2000° F.

TABLE

| Stream 22 O$_2$ Recovery mole/hr | Stream 10 Air Feed mole/hr | Stream 24 O$_2$ Partial Pressure PSIA | Stream 24 O$_2$ to Combustor mole % | Gas Turbine 38 Net Electric Power Hp, Kw | Total Net Electric Power Hp, Kw |
|---|---|---|---|---|---|
| 0 | 1000 | 36.3 | 21.0 | 1156.2 862.5 | 1665.9 1242.8 |
| 25 | 1025 | 32.8 | 19.0 | 1112.5 829.9 | 1622.2 1210.2 |
| 50 | 1050 | 29.5 | 17.1 | 1068.8 797.3 | 1578.5 1177.6 |
| 100 | 1100 | 22.6 | 13.1 | 981.3 732.1 | 1491.0 1112.3 |
| 150 | 1150 | 15.7 | 9.1 | 839.9 666.8 | 1403.6 1047.1 |
| 200 | 1200 | 9.0 | 5.2 | 806.4 601.6 | 1316.1 981.8 |

With reference to the Table and drawing, a number of exemplary oxygen recover embodiments are set forth compared to a baseline where no oxygen is recovered. The baseline sets forth a throughput of 1000 lb. moles/hr. of 100° F. air which is initially compressed adiabatically to 173 psia and 765° F. This throughput constitutes 314% excess air which is required to hold the combustor exhaust gas to the maximum 2000° F. temperature. The hot compressed air passes through the separation system 20 without recovery of oxygen in the initial case and is therein combusted with fuel in the combustor 30 to give a high temperature effluent, which is quenched by the bypass excess air 28 before being expanded to recover power in the gas turbine 38 and then cooled to generate steam in a waste heat boiler and turbine recovery system 50. The gas turbine generates sufficient power to provide 1331.4 kilowatts to drive the air compressor 12 via shaft 14 while providing a net power production via shaft 40 of 862.5 kilowatts through electrical generation. The steam turbine provides via 52 an additional 380 kilowatts of power to provide a total net power generation of 1243 kilowatts for the situation where no by-product oxygen is produced.

When by-product oxygen is separated and withdrawn in stream 22, the air compressed in line 10 can be increased by that amount to compensate for the moles of oxygen recovered. This additional compression requirement constitutes the power required to produce the recovered oxygen. As stated before, the additional compression is comparatively small for the oxygen recovered when contrasted with other oxygen recovery techniques. For instance, when 25 moles per hour of oxygen is sought, the total feed air compression in moles per hour must be increased to 1025. Accordingly, higher levels of recovery are illustrated in the Table with the corresponding effect on oxygen concentration and power recovery. By increasing the total amount of gas compressed by the total amount of oxygen gas recovered, the molar flow to the combustor remains constant. Additionally, compressor discharge temperature is unchanged and the fuel rate and combustor gas temperature from the combustor and to the expander are unchanged for adiabatic operation of the separation system 20. While oxygen content of the stream 24 is decreased from 21% to the respective amounts in the fourth column of the Table, the heat capacity is substantially unchanged because molar flow is unchanged and because oxygen and nitrogen have essentially the same molar heat capacity. Because stream 24 originally contained 300+% excess air and oxygen over stoichiometric combustion requirements, based upon methane fuel, the decreased oxygen flow and concentration to combustion will have no significant adverse affects on the combustion. With combustion fuel unchanged and combustion gas molar flow and heat capacity unchanged, combustor exhaust, temperature, molar flow and heat capacity are also unchanged. Therefore, gas turbine, waste heat boiler and steam turbine power generation are unchanged. However, in column 2 of the Table, it's apparent that the compressor requirements go up for the additional compression required to recover different increments of oxygen. Therefore the net power does go down. In the instance of 25 lb. mole/hr. of oxygen recovered, the net power is reduced to 1210.2 Kilowatts. This constitutes a reduction of 32.6 kilowatts from the baseline, where no oxygen is produced. This is equivalent to 82 kilowatts of incremental net power per ton of oxygen product. This is only 33% of the 250 kilowatts per hour per ton of oxygen required for a large, modern, efficient low pressure cryogenic oxygen plant. These examples show that the present invention potentially can produce by-product oxygen from a combined cycle power plant with very low incremental power requirements compared to more traditional oxygen separation equipment.

As shown in the lower lines of the Table, as the oxygen concentration goes down in the stream 24 from the air separation system 20 due to by-product oxygen recovery, some point is reached wherein the combustor performance will be adversely effected and this will limit oxygen withdrawal. Also, because the pressure of stream 22 must be less than the oxygen partial pressure of stream 24 to maintain a finite differential driving force for the separation, oxygen by-product pressure decreases as oxygen withdrawal is increased. When oxygen withdrawal is 100 moles or higher, oxygen would be withdrawn under vacuum. But even with these limitations, the oxygen by-product potential is very large. Withdrawal of 23% of the oxygen in the compressed air or 50 moles per hour from 1050 moles per hour of air as in the third line of the Table would produce 3866 tons per day of by-product oxygen from a state of the art 250 MW combined cycle power plant. The alternate modes of operation shown in dotted line configuration in the figure would alter the absolute value shown in the Table, but would still effect an attractive oxygen recovery at lower power requirements.

This constitutes a preferred embodiment of the present invention. It is understood that the invention can be practiced using a pressure and/or temperature swing sorption air separation unit 20 rather than the semipermeable membrane described with regard to the figure. The important consideration in using a pressure and/or temperature swing sorption system is that the oxygen must be the selectively sorbed component and the nitrogen must be the selectively unsorbed component in order to maintain the necessary pressure through the system to provide adequate total flow to the combustor and to the combustion turbine. Pressure swing, temperature swing and vacuum swing adsorption techniques are well known in the art for the recovery of both high purity oxygen, as well as high purity nitrogen. Therefore, it is deemed well within the skill of those in the art to contemplate oxygen recovery swing sorption techniques which could be utilized in the present invention for the recovery of a minor portion of the oxygen content of the air feed by selective adsorption of the oxygen, while the nitrogen component of the air feed is selectively passed through the adsorption bed without significant pressure drop.

The present invention provides significant power production wherein the total power is significantly larger than the power utilized, while recovering a minor portion of the total air throughput as an oxygen by-product of high purity, which oxygen is recovered at a correspondingly low utility level due to the nonenergy intensive nature of the oxygen separation and the ability to utilize the excess compressed air of the power turbine sequence for the recovery of the minor oxygen by-product stream. Again, because of the large excess of air passing through a power generating turbine system, it is possible to provide a separation of a minor, but significant, amount of oxygen at unexpectedly low utility costs to the overall system. In order to meet the specifications of the combustion turbine, it is necessary to compress additional air to make up for the volume lost to by-product oxygen recovery, and it is this additional level of compression which accounts for the utility costs paid to recover the oxygen, as well as minor amounts of compression requirements for the necessary pressure drop through equipment designed to selectively separate or resolve oxygen from the overall feed air stream.

The present invention has been set forth with regard to a specific preferred embodiment which should not be deemed to limit the scope of the invention. Those in the art of ordinary skill will be able to contemplate other obvious variants from the invention which are deemed to be within the scope of the invention, such scope being ascertained by the claims which follow.

I claim:

1. In a method for the generation of power in a combustion turbine and for the production of an oxygen-enriched by-product, comprising the steps of: compressing a feed airstream to an elevated pressure and temperature wherein the volume of air treated is in excess of that necessary for the combustion preceding the turbine; combusting a portion of the elevated pressure airstream with a fuel stream; bypassing another portion of the airstream around the combustion stage and quenching the combustion effluent with it; expanding the elevated pressure combustion product stream from said combustion through a turbine so as to provide power for the air compression and to recover net power from the system, the improvement comprising:

(a) separating a portion of the oxygen in the elevated pressure stream prior to expansion in the turbine while the stream is still at elevated temperature above 400° F. by passage of the stream over a semipermeable membrane which is selective to the permeation of oxygen over nitrogen; and (b) recovering oxygen-enriched gas as a by-product stream and a resulting oxygen-depleted elevated pressure stream for expansion through said turbine.

2. The method of claim 1 wherein the effluent from the combustion turbine is used to produce steam to generate additional net power.

3. The method of claim 1 wherein at least a portion of the effluent of the combustion turbine is heat exchanged against the air feed to preheat the same prior to combustion of the air feed.

4. The method of claim 1 wherein at least a portion of the effluent from the combustion turbine is heat exchanged with the feed air stream prior to the separation of oxygen to heat the feed air stream.

5. The method of claim 1 wherein the air compressor is mechanically linked to and driven by the combustion turbine.

6. The method of claim 1 wherein the net power is recovered in a generator which produces net electrical power.

7. The method of claim 1 wherein the air compressor provides in excess of 300% of the air requirements of the combustion zone.

8. A method for the generation of net power in a combustion turbine and for the production of an oxygen-enriched by-product, comprising the steps of:

(a) compressing a feed airstream to an elevated pressure and temperature wherein the volume of air treated is in excess of that necessary for the combustion preceding the turbine;

(b) separating a portion of the oxygen in the compressed airstream while still at elevated temperature above 400° F. by passage of the stream over a semipermeable membrane which is selective to the permeation of oxygen over nitrogen;

(c) recovering oxygen-enriched gas as a by-product stream and a resulting oxygen-depleted airstream;

(d) combusting a portion of the oxygen-depleted airstream with a fuel stream;

(e) bypassing another portion of the oxygen-depleted air stream around the combusting step and quenching the combustion product stream with it; and (f) expanding the combustion product stream from said combustion through a turbine so as to provide power for the air compression and to recover net power from the system.

9. A method for the generation of net power in a combustion turbine and for the production of an oxygen-enriched by-product, comprising the steps of:

(a) compressing a feed airstream to an elevated pressure and temperature wherein the volume of air treated is in excess of that necessary for the combustion preceding the turbine;

(b) combusting a portion of the airstream with a fuel stream;

(c) bypassing another portion of the air stream around the combustion step and quenching the combustion product stream with it;

(d) separating a portion of the oxygen in the elevated pressure combustion product stream while still at elevated temperature above 400° F. by passage of the stream over a semipermeable membrane which is selective to the permeation of oxygen over nitrogen;

(e) recovering oxygen-enriched gas as a by-product stream and a resulting oxygen-depleted airstream; and (f) expanding the combustion product stream from said combustion through a turbine so as to provide power for the air compression and to recover net power from the system.

10. In a method for the generation of power in a combustion turbine and for the production of an oxygen-enriched by-product, comprising the steps of: compressing a feed airstream to an elevated pressure and temperature wherein the volume of air treated is in excess of that necessary for the combustion preceding the turbine; combusting a portion of the elevated pressure airstream with a fuel stream; bypassing another portion of the airstream around the combustion stage and quenching the combustion effluent with said bypassed portion; expanding the elevated pressure combustion product stream from said combustion through a turbine so as to provide power for the air compression and to recover net power from the system, the improvement comprising:

(a) separating a portion of the oxygen in the elevated pressure stream prior to expansion in the turbine while the stream is still at elevated temperature above 400° F. by passage of the stream through switching beds of an adsorbent selective to the retention of oxygen over nitrogen in a pressure and/or temperature swing adsorption cycle, and (b) recovering oxygen-enriched gas as a by-product stream and a resulting oxygen-depleted elevated pressure stream for expansion through said turbine.

* * * * *